US009183854B2

(12) United States Patent
Wan et al.

(10) Patent No.: US 9,183,854 B2
(45) Date of Patent: Nov. 10, 2015

(54) METHOD TO MAKE INTERFEROMETRIC TAPER WAVEGUIDE FOR HAMR LIGHT DELIVERY

(71) Applicant: Western Digital (Fremont), LLC, Fremont, CA (US)

(72) Inventors: Dujiang Wan, Fremont, CA (US); Ge Yi, San Ramon, CA (US); Lijie Zhao, Pleasanton, CA (US); Hai Sun, Milpitas, CA (US); Yunfei Li, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/303,876

(22) Filed: Jun. 13, 2014

(65) Prior Publication Data
US 2015/0243304 A1 Aug. 27, 2015

Related U.S. Application Data

(60) Provisional application No. 61/943,951, filed on Feb. 24, 2014.

(51) Int. Cl.
*G11B 5/31* (2006.01)
*G02B 6/122* (2006.01)
*G02B 6/10* (2006.01)
*G02B 6/136* (2006.01)

(52) U.S. Cl.
CPC *G11B 5/314* (2013.01); *G02B 6/10* (2013.01); *G02B 6/122* (2013.01); *G02B 6/136* (2013.01)

(58) Field of Classification Search
CPC .... G02B 6/136; G02B 6/122; G02B 6/12002; G02B 2006/12166; G02B 2006/12176; G02B 6/10; G02B 2006/12173
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |

(Continued)

Primary Examiner — Duy Deo

(57) ABSTRACT

A method for making an interferometric taper waveguide (I-TWG) with high critical dimension uniformity and small line edge roughness for a heat assisted magnetic recording (HAMR) head, wherein the method includes creating an I-TWG film stack with two hard mask layers on top of an I-TWG core layer sandwiched between two cladding layers, defining a photoresist pattern over the I-TWG film stack using deep ultraviolet lithography, transferring the pattern to the first hard mask layer using reactive ion etching (RIE), forming a temporary I-TWG pattern on the second hard mask layer using RIE, transferring the temporary pattern to the I-TWG core using RIE, refilling the cladding layer, and planarizing using chemical mechanical planarization (CMP).

9 Claims, 4 Drawing Sheets

(56) References Cited

U.S. PATENT DOCUMENTS

| | | | |
|---|---|---|---|
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |

(56) References Cited

U.S. PATENT DOCUMENTS

| | | | |
|---|---|---|---|
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,732,550 B2 * | 5/2004 | Won .............................. 65/386 |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |

(56) References Cited

U.S. PATENT DOCUMENTS

| | | |
|---|---|---|
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,710,686 B2 | 5/2010 | Kim et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,482 B2 | 7/2012 | Suh et al. |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |

(56) References Cited

U.S. PATENT DOCUMENTS

| | | |
|---|---|---|
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,509,037 B1 | 8/2013 | Huang et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 * | 7/2014 | Luo et al. ........................ 216/24 |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2005/0123232 A1 * | 6/2005 | Piede et al. ..................... 385/14 |
| 2007/0159720 A1 | 7/2007 | Sohn et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0328243 A1 | 12/2012 | Fang et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

* cited by examiner

5A I-TWG photoresist.  5B I-TWG hardmask 1.  5C I-TWG hardmask 2.  5D I-TWG final pattern.

6A. Post I-TWG RIE TEM image at I-TWG directional coupler site.

6B. Post SiO2 refill FEI image at I-TWG directional coupler site.

6C. Post I-TWG WGE FEI image at I-TWG taper site.

6D. Post I-TWG CMP FEI image at I-TWG directional coupler site.

METHOD TO MAKE INTERFEROMETRIC TAPER WAVEGUIDE FOR HAMR LIGHT DELIVERY

CROSS-REFERENCE TO RELATED APPLICATIONS

This application claims the benefit of and priority to U.S. Provisional Application 61/943,951 filed on Feb. 24, 2014, the contents of which are incorporated herein by reference.

TECHNICAL FIELD

The present disclosure relates to magnetic recording technology, and in particular, to a method for manufacturing a light delivery component for use in heat-assisted magnetic recording media.

BACKGROUND

For all types of substrates, perpendicular magnetic recording (PMR) technology has become more prevalent in magnetic recording media with the goal of increasing areal density. Areal density is generally limited by the media's ability to, at a sufficiently small bit size, write a data bit, read back the same data bit, and maintain the magnetic characteristics of the data bit over time. For magnetic media, these parameters are controlled by the materials coercivity. However, there exists a threshold wherein the coercivity is so high, and the bit size so small, that the writing element must use an impractically high magnetic field to affect change to a data bit. The advent of heat-assisted magnetic recording (HAMR) media addresses this problem by applying heat to a data bit during a write operation to lower the coercivity to a writable level, and then removing the heat to allow the coercivity to return to a high level to keep the data bit stable.

By using HAMR technology, areal density in hard disk drives can be extended beyond 1 Tb/in$^2$. FIG. 1 illustrates a HAMR head light delivery system design. Laser light from an external laser diode (LD) 100 is coupled into interferometric taper waveguide (I-TWG) 200 by mode converter (MC) 210, and then delivered through I-TWG 200 to near field transducer (NFT) 250 at air bearing surface (ABS) 270, which focuses the laser generated light energy into a less than 50 nm spot on the PMR media surface.

The structure of an I-TWG 200, as shown in FIG. 2, includes several critical components including mode converter taper 210, splitter 220, and directional coupler 230. Constructing these components into a unified structure on a single wafer with homogenous deposition and etching technologies is challenging because the components have very different dimensional scale, but dimensional accuracy is extremely important to operational performance of the HAMR. For example, the I-TWG taper angle and length, waveguide critical dimension uniformity (CDU), line edge roughness (LER), splitter asymmetry, and MC-to-taper overlay are critical to the HAMR's signal-to-noise ratio (SNR), head longevity, and power consumption. Directional coupler 230 is used to return some of the laser light to the backside of slider 150 (as shown in FIG. 1) for laser alignment adjusting. However, dimensional accuracy necessary to control the taper angle and length, CDU, LER, splitter asymmetry, and MC-to-taper overlay is difficult to control, particularly when building the I-TWG on a single substrate. Accordingly, currently available I-TWG methods tend to use more expensive, multi-substrate construction and tend to result in structures with variances in these critical parameters. The resulting I-TWG's are not ideal in their efficiency, power consumption, and head life.

BRIEF SUMMARY OF THE DISCLOSURE

The present disclosure is directed towards magnetic recording media, and in particular, a method for making an I-TWG for a HAMR head on a single substrate with increased dimensional accuracy. Embodiments of this disclosure describe a method for making an I-TWG for a HAMR head that efficiently delivers laser light from the backside of a slider to an ABS region, resulting in an HAMR with extended head life and reduced power consumption.

In one example, a method for manufacturing a waveguide includes depositing a film stack with two different hard mask layers on a cladding-core-cladding sandwich and defining a first pattern in a photoresist layer on the film stack. A method for making a waveguide may also include transferring the pattern to a first hard mask layer, removing the photoresist layer, and forming a second pattern in a second hard mask layer patterned from the first pattern in the first hard mask layer. A method for making a waveguide may also include transferring the second pattern to the core layer and planarizing a top surface of the waveguide.

In some examples, a first hard mask layer is $Ta_2O_5$, a second hard mask layer is Cr, and the cladding layers are $SiO_2$. Various material compositions of the hard mask and cladding layers are possible as would be known to one of ordinary skill in the art.

In some examples, the defining of the I-TWG pattern in photoresist is accomplished with deep ultraviolet lithography, the transferring the pattern to the hard mask layers and the core layer is accomplished with reactive ion etching processes. In further examples, the planarizing is chemical mechanical planarizing.

BRIEF DESCRIPTION OF THE DRAWINGS

Various embodiments are illustrated by way of example, and not limitation, in the figures of the accompanying drawings in which.

DETAILED DESCRIPTION

In the following description, numerous specific details are set forth to provide a thorough understanding of various embodiment of the present disclosure. It will be apparent to one skilled in the art, however, that these specific details need not be employed to practice various embodiments of the present disclosure. In other instances, well known components or methods have not been described in detail to avoid unnecessarily obscuring various embodiments of the present disclosure.

As disclosed herein, a process for manufacturing a waveguide includes depositing a film stack wherein the film stack includes a first hard mask layer, a second hard mask layer, a first cladding layer, a core layer, and a second cladding layer. Some embodiments include defining a first pattern in a photoresist layer, transferring the first pattern to the first hard mask layer, and removing the photoresist layer. Several embodiments may also include forming a second pattern in the second hard mask layer patterned from the first pattern in the first hard mask layer, and transferring the second pattern to the core layer. Some embodiments my also include planarizing a top surface of the waveguide. In some examples, the core layer is deposited on the second cladding layer, the first cladding layer is deposited on the core layer, the second hard mask layer is deposited on the first cladding layer, and the first hard mask layer is deposited on the second hard mask layer. Further, in some examples of the disclosure, the first hard mask layer comprises $Ta_2O_5$, the second hard mask layer comprises Cr, the first cladding layer comprises $SiO_2$, the core layer comprises $Ta_2O_5$, and the second cladding layer comprises $SiO_2$. The deposit and removing processes disclosed may include reactive ion etching, deep ultraviolet lithography, chemical mechanical planarization, and other lithography and manufacturing processes as are known in the art.

Figure 1:
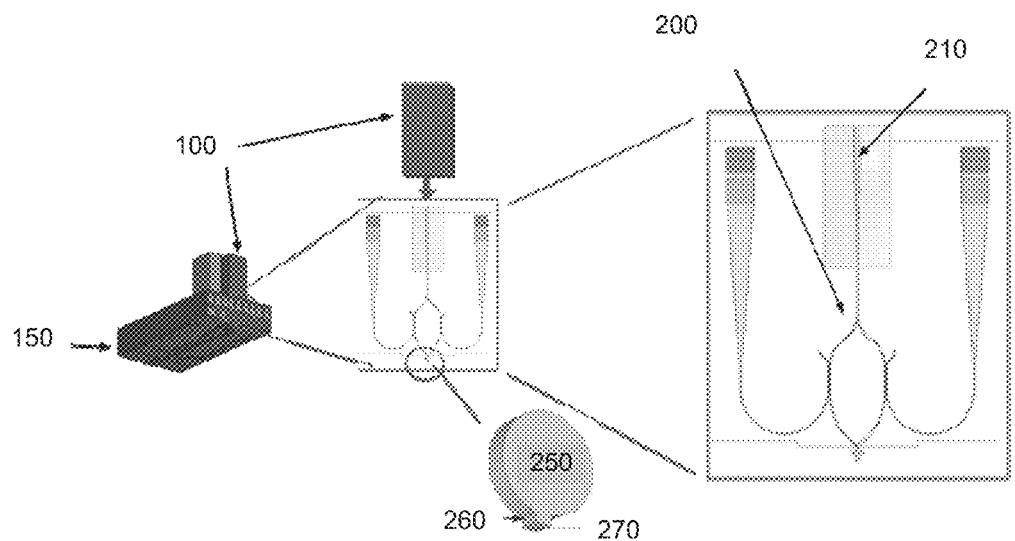
FIG. 1 illustrates an example interferometric taper waveguide (I-TWG) as used in heat-assisted magnetic recording media (HAMR)

FIG. 1 illustrates an example interferometric taper waveguide (I-TWG) as used in heat-assisted magnetic recording media (HAMR). A HAMR device includes a laser 100 mechanically coupled to a slider 150 and an I-TWG. FIG. 1 illustrates a blown up view of the I-TWG 200 coupled to a mode converter 210. The I-TWG and mode converter structures may be constructed on a single substrate, or may be an assembly of components constructed on different substrates. The waveguide structures of the I-TWG may be less than a few microns wide, but may also scale up to larger sizes depending on the wavelength of the laser. Laser wavelength may be selected for efficient delivery of heat through the I-TWG to the media surface, as would be known in the art. For example, laser diodes that emit wavelengths in the range of 375 nm to 830 nm may be used. The type of laser diode selected only affects the design of the I-TWG to the extent that the critical dimensions of the waveguide may be optimally selected depending on the type of laser diode used. Near field transducer 250 couples to the opposite end of I-TWG 200 from mode converter 210. Near field transducer 250 includes an air bearing surface 270.

Figure 2:
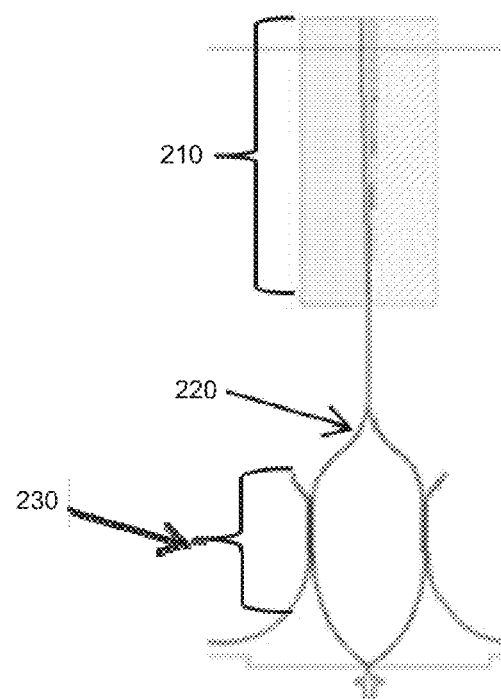
FIG. 2 is a schematic diagram of an I-TWG.

FIG. 2 is a schematic diagram of an I-TWG. Mode converter 210 is optically couples to splitter 220. Splitter 220 optically couples to directional coupler 230. Referring to FIGS. 1 and 2, optimally, the critical dimensions uniformity of the I-TWG will vary by less than 5 nm.

Figure 3:
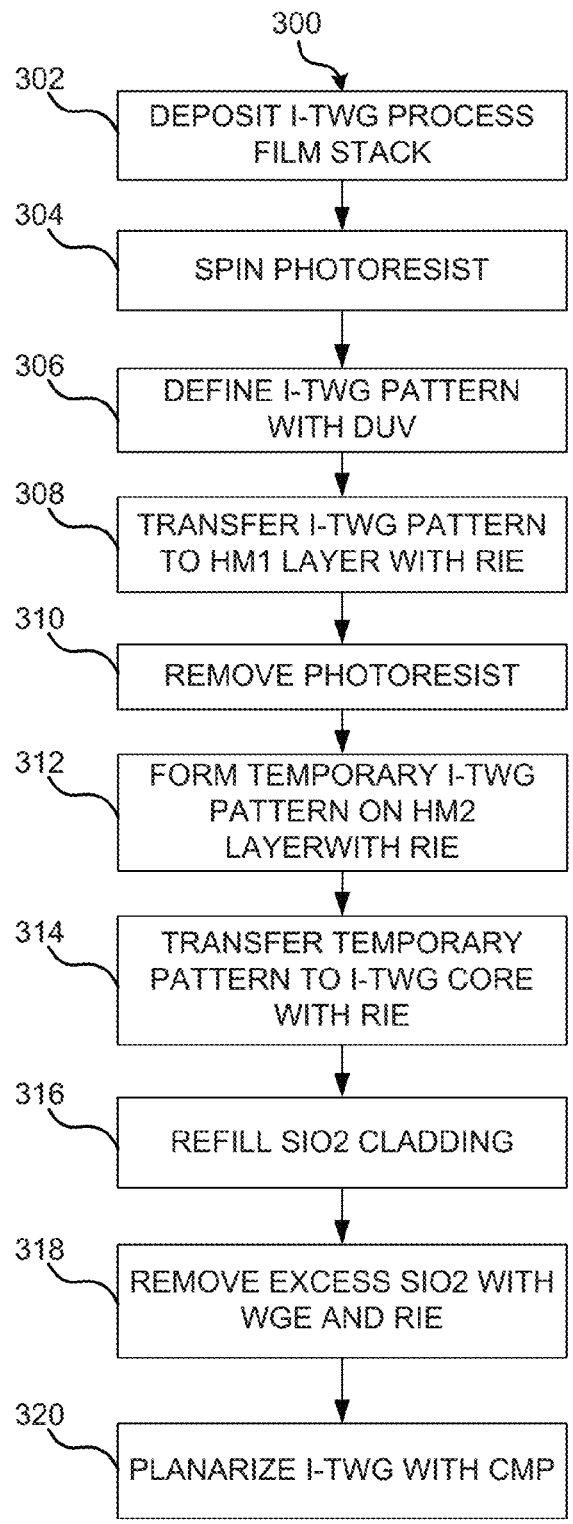
FIG. 3 is a diagram illustrating a process for making an I-TWG.

FIG. 3 is a diagram illustrating a process for making an I-TWG. Referring now to FIG. 3, one embodiment of a method for making an I-TWG 300 includes the steps of depositing an I-TWG film stack at step 302, spinning a photoresist pattern at step 304, and defining an I-TWG pattern with deep ultraviolet (DUV) lithography at step 306. The method may also include transferring the I-TWG pattern to a first hardmask layer (HM1) using a reactive ion etch (RIE) process at step 308, and removing the photoresist at step 310. The method may also include forming a temporary I-TWG pattern on a second hardmask layer (HM2) using a RIE process at step 312, and transferring the temporary pattern to an I-TWG core layer with a RIE process at step 314. In some embodiments, a process for making an I-TWG also includes refilling a SiO2 cladding layer around the I-TWG structure at step 316, removing excess SiO2 with a waveguide etch (WGE) process and/or RIE process at step 318, and planarizing the I-TWG structure with chemical mechanical planarization (CMP) at step 320.

FIG. 4A is a scanning electron microscope (SEM) top view of an I-TWG formed on a substrate. Referring now to FIG. 4A, the I-TWG structure may be formed on a SiO2 substrate, such as a wafer, using lithographic processes. FIG. 4A further demonstrates the taper shaped I-TWG pattern 405 from a top down view. FIGS. 4B through 4K illustrate cross section top views of the I-TWG structure as it is formed, as described in several embodiments of this disclosure, using processes including photolithography, reactive ion etching (RIE), and chemical mechanical planarization (CMP) steps.

FIG. 4B illustrates a cross-section view and a top view of an I-TWG film stack. Referring now to FIG. 4B, and also to FIG. 3, an I-TWG film stack as used in some embodiments of the disclosure may be formed using material deposition techniques as would be known to one of ordinary skill in the art. In some embodiments, the I-TWG film stack includes a first hard mask layer (HM1) 410, a second hard mask layer (HM2) 420, a top cladding layer 430, an I-TWG core layer 440, and a bottom cladding layer 450. In some embodiments, the HM1 layer 410 comprises $Ta_2O_5$ or Ta, the HM2 layer 420 comprises Cr or Ru, the top cladding layer 430 comprises SiO2, the I-TWG core layer 440 comprises $Ta_2O_5$, and the bottom cladding layer 450 comprises $SiO_2$. Other material stacks may be used as would be known to one of ordinary skill in the art wherein the general structure includes two hard mask layers 410 and 420 and an I-TWG core 440 sandwiched by two cladding layers 430 and 450. As shown in FIG. 4A, a bi-layer hard mask deposition of Cr and $Ta_2O_5$ may be used to provide sufficient protection for the I-TWG structure during the RIE processes. The HM1 layer 410 may also be used as a CMP stop layer during I-TWG final planarization in step 320.

FIG. 4C illustrates a cross-section view and a top view of an I-TWG film stack with photoresist pattern deposited thereon. Referring now to FIG. 4C, and still referring to FIG. 3, a photoresist layer 460 may be spun on the film stack in step 304. A deep ultraviolet (DUV) photolithography process may then be used to define the I-TWG pattern in the photoresist layer 460 at step 306. The I-TWG pattern may then be transferred to the HM1 layer 410 through an RIE process in step 308.

FIG. 4D illustrates a cross-section view and a top view of an I-TWG film stack following both a photolithography pattern definition process and a reactive ion etch (RIE) pattern transferring process. Referring now to FIG. 4D, and still referring to FIG. 3, the relative position of the taper and mode converter structures of the I-TWG may be precisely controlled using DUV scanner photolithography process at step 308. Alternatively, in some embodiments of the disclosure, other photolithography and/or ion etching or milling processes, or combinations thereof, may be used to form the I-TWG structure as would be known to one skilled in the art. Referring again to FIGS. 3 and 4C, the photolithography layer 460 may be removed using a dry etching process, for example, using a resist ashing process at step 310. In other embodiments of the disclosure, photoresist removal techniques specific to the type of resist use, but non-corrosive to the remaining HM1 and HM2 layers, such as chemical stripping, may be used.

FIG. 4E illustrates a cross-section view and a top view of an I-TWG film stack following a photoresist removal process. Referring now to FIG. 4E, the resulting I-TWG structure has a clean, resist-free surface with an I-TWG pattern etched on the HM1 layer 410. Referring again to FIG. 3, a second RIE process 312, using the already formed I-TWG pattern in HM1 layer 410, may be used to form a temporary I-TWG pattern in HM2 layer 420.

FIG. 4F illustrates a cross-section view and a top view of an I-TWG film stack following the second RIE pattern forming process 312. Referring now to FIG. 4F, a temporary I-TWG pattern is formed in HM2 layer 420. Referring again to FIGS. 3 and 4B, the temporary I-TWG pattern formed in step 312 may be transferred through cladding layer 430 to I-TWG core layer 440 using a third RIE process 314.

FIG. 4G illustrates a cross-section view and a top view of an I-TWG film stack following the third RIE pattern forming process 314. Referring now to FIG. 4G, the I-TWG pattern is successfully transferred to I-TWG core layer 440 to form a final I-TWG structure. Further, the HM1 layer 410 may also be removed by RIE process 314. However, RIE process 314 also may remove substantial portions of cladding layer 450. Referring again to FIG. 3, SiO2 cladding may be re-deposited around the I-TWG structure in step 316. In some embodiments of the disclosure, the cladding material may be other selected from other cladding materials known to one of skill in the art.

FIG. 4H illustrates a cross-section view and a top view of an I-TWG film stack following the cladding refill process 316. Referring now to FIG. 4H, the final I-TWG structure formed in I-TWG core layer 440 is embraced by cladding material that was refilled in step 316. Referring again to FIG. 3, excess cladding material may be removed using a waveguide etch (WGE) process and/or a fourth RIE process at step 318.

FIG. 4I illustrates a cross-section view and a top view of an I-TWG film stack during the WGE photolithography process from step 318. Referring now to FIG. 4I, a second photoresist WGE pattern may be defined on the I-TWG structure and excess cladding material deposited in step 316 may be removed by a fourth RIE process. In other embodiments of the disclosure, excess cladding material may be removed using other removal processes as would be known to one of skill in the art. Referring again to FIG. 3, the resulting I-TWG structure shown in FIG. 4I may be planarized using a chemical mechanical planarization (CMP) process at step 320.

FIG. 4J illustrates a cross-section view and a top view of an I-TWG film stack following CMP process 320. The resulting structure includes an I-TWG structure surround by cladding, and planarized, but with HM2 layer 420 still capping the top of the structure. HM2 layer 420 may be subsequently removed using a wet etch process, or other mask removal processes as would be known to one of skill in the art.

FIG. 4K illustrates a cross-section view and a top view of an I-TWG film stack following the HM2 removal process. Referring now to FIG. 4K, a resulting I-TWG structure with cladding is completely flat, allowing for easy integration with other HAMR components while the I-TWG structure is still attached to its substrate wafer.

Figure 5:
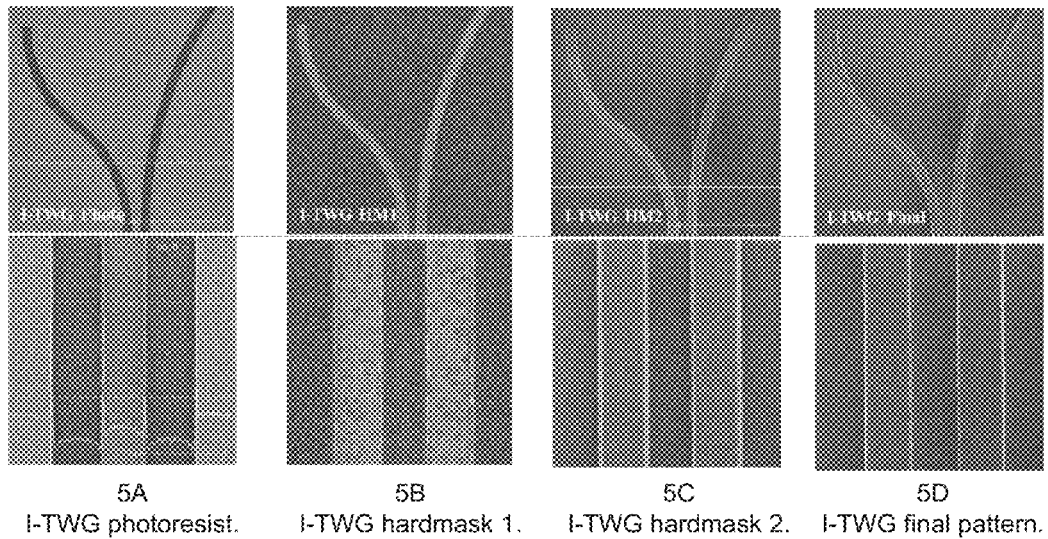
FIG. 5A is a SEM top view image of an I-TWG photoresist pattern as part of a process to make an I-TWG.
FIG. 5B is a SEM top view image of an I-TWG hardmask 1 (HM1) layer pattern as part of a process to make an I-TWG.
FIG. 5C is a SEM top view image of an I-TWG hardmask 1 (HM2) layer pattern as part of a process to make an I-TWG.
FIG. 5D is a SEM top view image of an I-TWG final pattern.

FIG. 5A is a SEM top view image of an I-TWG with photoresist I-TWG pattern. Now referring to FIG. 5A, and again referring to FIG. 3, a photoresist I-TWG pattern may be defined over the I-TWG film stack at step 304. The photoresist pattern forms the shape of the taper waveguide components (e.g. splitter 220 and directional coupler 230 as shown in FIG. 2).

FIG. 5B is a SEM top view images of an I-TWG hard mask layer HM1 410 following transfer of the I-TWG pattern at step 308 and removal of the photoresist at step 310. Referring to FIG. 5B, the I-TWG structure is clearly defined in HM1.

FIG. 5C is a SEM top view images of an I-TWG hard mask layer HM2 420 following formation of the temporary I-TWG pattern at step 312. Referring to FIG. 5C, the I-TWG structure is clearly defined in HM2.

FIG. 5D is a SEM top view image of an I-TWG final pattern in I-TWG core layer 440.

Figure 6:
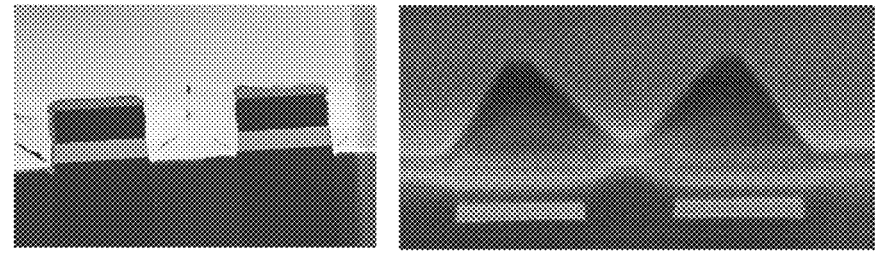
FIG. 6A is a transmission electron microscope (TEM) image of an I-TWG directional coupler site following a reactive ion etch (RIE) process.
FIG. 6B is a SEM image of an I-TWG directional coupler site following an SiO2 refill process.
FIG. 6C is a SEM image of an I-TWG taper site following a waveguide etch (WGE) process.
FIG. 6D is a SEM image of an I-TWG directional coupler site following a chemical mechanical planarization (CMP) process.
Figure 6:
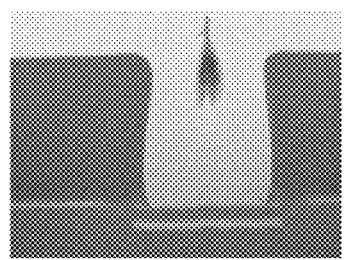
Figure 6:
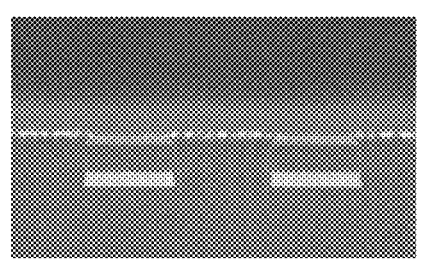

FIG. 6A is a transmission electron microscope (TEM) cross-section image of an I-TWG directional coupler site following a reactive ion etch (RIE) process at step 314. Referring to FIG. 6A, the cross-section of the directional coupler section of the I-TWG structure can be seen with HM2 layer 420 remaining on cladding layer 430, which in turn is layered on I-TWG core layer 440.

FIG. 6B is a SEM image of the same I-TWG directional coupler site shown in FIG. 6A following SiO2 refill process 316. Referring to FIG. 6B, the dark SiO2 cladding material can be seen filling in the gaps left from RIE process 314.

FIG. 6C is a SEM image of an I-TWG taper site following WGE process 318.

FIG. 6D is a SEM image of the same I-TWG directional coupler site shown in FIGS. 6A and 6B following CMP process 320. Referring to FIG. 6D, the resulting I-TWG directional coupler structure is fully clad in SiO2, and completely flat, enabling easy integration with other HAMR components while still on the wafer substrate (i.e. integration with a writer).

Figure 4:
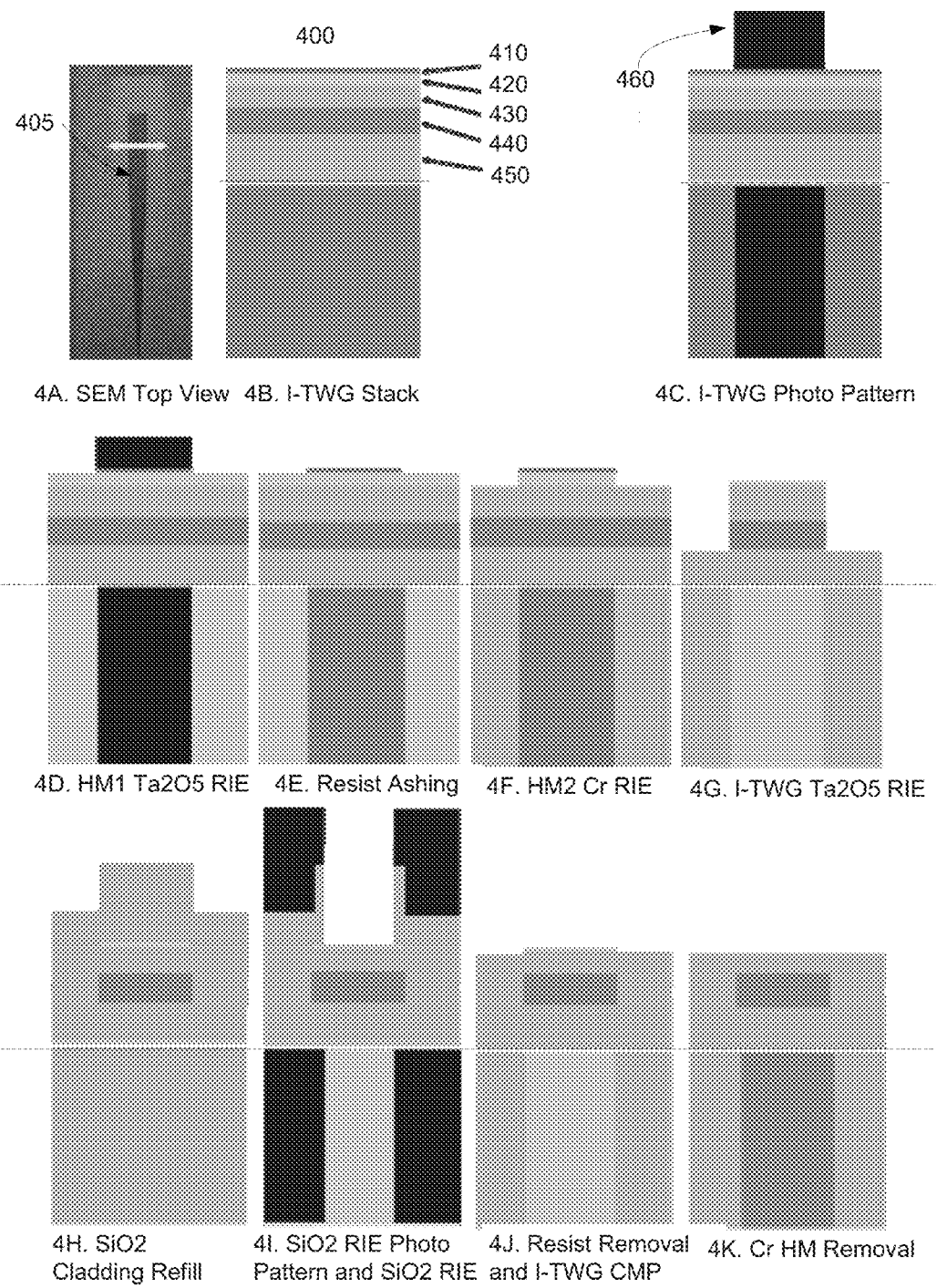
FIG. 4A is a scanning electron microscope (SEM) top view of an I-TWG formed on a substrate.
FIG. 4B illustrates a cross-section view and a top view of an I-TWG film stack.
FIG. 4C illustrates a cross-section view and a top view of an I-TWG film stack with photoresist pattern deposited thereon.
FIG. 4D illustrates a cross-section view and a top view of an I-TWG film stack following a photolithography pattern forming process and a reactive ion etch (RIE) pattern forming process.
FIG. 4E illustrates a cross-section view and a top view of an I-TWG film stack following a photoresist removal process.
FIG. 4F illustrates a cross-section view of an I-TWG film stack following a second RIE pattern forming process.
FIG. 4G illustrates a cross-section view and a top view of an I-TWG film stack following a third RIE pattern forming process.
FIG. 4H illustrates a cross-section view and a top view of an I-TWG film stack following a cladding refill process.
FIG. 4I illustrates a cross-section view and a top view of an I-TWG film stack following a photolithography pattern forming process step and a fourth RIE pattern forming process.
FIG. 4J illustrates a cross-section view and a top view of an I-TWG film stack following a planarization process.
FIG. 4K illustrates a cross-section view and a top view of an I-TWG film stack following a hard mask removal process.

The process embodied by the disclosure illustrated by FIGS. 3 and 4, along with process variations as would be known to one of ordinary skill in the art, can result in an I-TWG structure with superior critical dimension uniformity (CDU) and small line edge roughness, and that is capable of delivering laser light from the backside of the slide 150 to NFT 250, and coupling ABS region 270 to form a less than 50 nm hot spot on the surface of the recording media with minimal power usage.

In one embodiment, a process for manufacturing an interferometric taper waveguide (I-TWG) for heat assisted magnetic recording (HAMR) laser light delivery comprises depositing an I-TWG film stack, spinning a photoresist pattern, defining an I-TWG pattern using deep ultraviolet lithography (DUV), transferring the I-TWG pattern to a first hard mask layer using reactive ion etching (RIE), removing the photoresist layer, forming a temporary I-TWG pattern on a second hard mask layer using RIE, creating a final I-TWG pattern by transferring the temporary I-TWG pattern to an I-TWG core layer using RIE, refilling cladding around the final I-TWG pattern, removing excess cladding using waveguide etching lithography (WGE) and RIE, planarizing using chemical mechanical planarization (CMP), and removing the second hard mask layer using wet etching. In some embodiments, the I-TWG film stack comprises a first hard mask layer of $Ta_2O_5$ or Ta, a second hard mask layer of Cr or Ru, a top cladding layer of $SiO_2$, an I-TWG core layer of $Ta_2O_5$, and a bottom cladding layer of $SiO_2$.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for manufacturing an interferometric taper waveguide (I-TWG), the method comprising:
    depositing a film stack, the film stack comprising a plurality of hard mask layers and a cladding-core sandwich layer, wherein the plurality of hard mask layers is located above the cladding-core sandwich layer, and the cladding-core sandwich layer comprises a top cladding layer, a bottom cladding layer, and a core layer located between the top cladding layer and the bottom cladding layer;
    spinning a photoresist layer on a top hard mask layer;
    defining with a first microfabrication process an I-TWG pattern in the photoresist layer;
    transferring with a second microfabrication process the I-TWG pattern to the top hard mask layer;
    removing the photoresist;
    forming with a third microfabrication process the I-TWG pattern in a bottom hard mask layer;
    transferring with a fourth microfabrication process the I-TWG pattern to the core layer;
    refilling cladding material;
    removing with a fifth microfabrication process excess cladding material;
    planarizing with a sixth microfabrication process a top surface of the I-TWG; and
    removing with a seventh microfabrication process the bottom hard mask layer.

2. The method of claim 1 wherein each of the plurality of hard mask layers comprises $Ta_2O_5$, Ta, Cr, or Ru.

3. The method of claim 1 wherein the cladding layers comprise $SiO_2$ and the core layer comprises $Ta_2O_5$.

4. The method of claim 1 wherein the first microfabrication process comprises using deep ultraviolet lithography.

5. The method of claim 1 wherein the second microfabrication process, the third microfabrication process, and the fourth microfabrication process each comprise using reactive ion etching.

6. The method of claim 1 wherein the fifth microfabrication process comprises using waveguide etching and reactive ion etching.

7. The method of claim 1 wherein the sixth microfabrication process comprises using chemical mechanical planarization.

8. The method of claim 1 wherein the seventh microfabrication process comprises using wet etching.

9. The method of claim 1 wherein the I-TWG pattern comprises a taper waveguide pattern, a directional coupler pattern, and a splitter pattern.

\* \* \* \* \*